United States Patent [19]
Piercy

[11] Patent Number: 4,787,084
[45] Date of Patent: Nov. 22, 1988

[54] FRAME CODE CONVERTER

[75] Inventor: John R. Piercy, Mississauga, Canada

[73] Assignee: Amdahl Corporation, Sunnyvale, Calif.

[21] Appl. No.: 19,046

[22] Filed: Feb. 26, 1987

[51] Int. Cl.$^4$ .............................................. H04L 7/00
[52] U.S. Cl. .................................. 370/105; 370/110.1
[58] Field of Search .................. 370/99, 55, 110.1, 43, 370/105, 100, 106; 375/106, 114, 116

[56] References Cited

U.S. PATENT DOCUMENTS

| | | | |
|---|---|---|---|
| 3,261,921 | 7/1966 | Hakim et al. | 370/105 |
| 4,002,846 | 1/1977 | Barbier | 370/105 |
| 4,468,767 | 8/1984 | Warren et al. | 370/55 |
| 4,658,152 | 4/1987 | Walters | 370/99 |
| 4,674,087 | 6/1987 | Green et al. | 370/110.1 |
| 4,730,346 | 3/1988 | Jiang | 370/105 |

FOREIGN PATENT DOCUMENTS 0012142 1/1986 Japan ........................................ 370/99

Primary Examiner—Douglas W. Olms
Assistant Examiner—Melvin Marcelo
Attorney, Agent, or Firm—Fliesler, Dubb, Meyer & Lovejoy

[57] ABSTRACT

An apparatus for converting a frame code from a T-1 multiplexed data stream having a framing pattern in a first preselected format such as DMA-1, to a frame code in an output data stream having a framing pattern according to a second preselected format such as D2/D4. A data path is connected to receive the data stream for supplying the output data stream. Framing windows in the data stream are identified and modified by combining with a selected frame code modifier. The output data stream is then supplied to a T-1 receiver circuit adapted to the second preselected format.

16 Claims, 2 Drawing Sheets

FRAME CODE CONVERTER

FIELD OF THE INVENTION

The present invention relates to time-multiplexed serial data channels and more particularly to modification of framing patterns used in serial communication links.

BACKGROUND OF THE INVENTION

Time-multiplexed data channels are currently enjoying a wide variety of applications. Typically such time-multiplexed data signals serially transmit a number of channels with each channel having a dedicated time slot within a frame. Further, the time slot within a frame of each channel is identified with reference to a marker known as a framing bit having a dedicated bit location within the frame. For instance, a Bell System standard format known as DS-1 is used to transmit 24 separate channels of pulse code-modulated voice signals or digital data at 1.544 MHz. Each channel is allocated a time slot for 8 bits during each frame. All 24 channels are grouped together to form a group of 192 bits and each group of 192 bits is preceded by a framing bit. Together, the 193 bits make up a frame and 12 frames are grouped together to form a superframe. In addition to the framing bit, signaling bits are included within the framing structure. However, the signaling bits vary from one specification to another.

The 12 framing bits within a superframe define a framing pattern. The Bell System standard known as D2/D4 framing uses a standard framing pattern as set out below in Table 1, where a terminal framing bit $F_T$ alternates with a signaling framing bit $F_S$.

TABLE 1

| FRAME NUMBER | S-BIT TERMINAL FRAMING $F_T$ | SIGNALING FRAMING $F_S$ |
|---|---|---|
| 1 | 1 | — |
| 2 | — | 0 |
| 3 | 0 | — |
| 4 | — | 0 |
| 5 | 1 | — |
| 6 | — | 1 |
| 7 | 0 | — |
| 8 | — | 1 |
| 9 | 1 | — |
| 10 | — | 1 |
| 11 | 0 | — |
| 12 | — | 0 |

In order to decode information in the serial channels, the framing bits must be isolated. This problem of isolating frame codes requires complicated circuitry that must be adapted to a particular frame code to be effective. Because the Bell System standard D2/D4 framing code has gained widespread acceptance, Rockwell International has produced a single integrated circuit known as the R8060 T-1 receiver for detecting the D2/D4 framing code. (See T-1 Primer, Document No. 219300N10, Rockwell International, Feb. 1984).

However, other framing patterns are in widespread use. For instance, a standard known as DMA-1 is implemented by placing alternatively one and zero in consecutive framing bit locations.

Because of the availability of the Rockwell R8060 T-1 receiver and related circuitry, it is desirable to modify framing patterns such as the DMA-1 so that they can be received using the Rockwell standard chip. Prior methods for detecting the non-standard framing patterns require large numbers of integrated circuits and are relatively time-consuming. For instance, in one method, circuitry starts at an arbitrary bit location within a data stream and searches from this arbitrary location forward, checking each consecutive bit location to detect the frame code pattern. This forward checking method requires approximately 40 integrated circuits to accomplish and can take a large amount of time to locate the framing bit. Further, the time it takes to locate a framing bit is extremely dependent on the type of data in the non-frame bit locations.

A second method of frame code detection that could be adapted to detect frame codes works by taking 8 frames of data and storing it in a 193 bit by 8 matrix. Each 8-bit row in the matrix is then searched for the framing pattern. This second method still suffers from the fact that a large number of integrated circuits are required. However, it greatly reduces the time required for determining frame bit locations.

The expense of creating and manufacturing a circuit for detecting non-standard framing codes is amplified by the need to be compatible with more than one type of framing code. Accordingly, it is desirable to have a system which can economically detect more than one format of framing codes.

SUMMARY OF THE INVENTION

The present invention provides an apparatus for converting a non-standard framing code to a standard framing code in order to take advantage of frame search integrated circuits, such as the Rockwell R8060. With conversion, detection of non-standard formats is accomplished using far fewer integrated circuits than is possible with previous methods. Also, the frame code conversion is independent of the actual frame detection circuitry utilized. In addition, the apparatus of the present invention provides the option to bypass the frame code conversion circuit to allow standard frame detection as well as the non-standard frame detection in a single circuit.

Accordingly, in one aspect, the present invention is an apparatus for converting a frame code from a received data stream having a framing pattern in a first preselected format to a frame code in an output data stream having a framing pattern according to a second preselected format. The apparatus comprises a data path connected to receive the data stream for supplying the output data stream. In communication with the data path, a framing means identifies framing windows in the data stream. Modifying means generates a frame code modifier in response to the identification of a framing window. The frame code modifier is combined with the data stream in the identified framing window to generate a frame code according to the second preselected format for the output data stream.

In a second aspect, the apparatus of the present invention further includes means in communication with the data path for detecting data that does not match the first preselected format in the received data stream. In response to the detection of data that does not match the first preselected format, the output data stream is forced to a default value to prevent known non-frame data from being converted erroneously to an illegal frame code.

In a third aspect, the frame code converter includes a means for disabling the generation of the frame code modifier to allow the input data stream to pass without alteration.

DETAILED DESCRIPTION

With reference to the figures, the preferred embodiment of the present invention is described.

Figure 1:
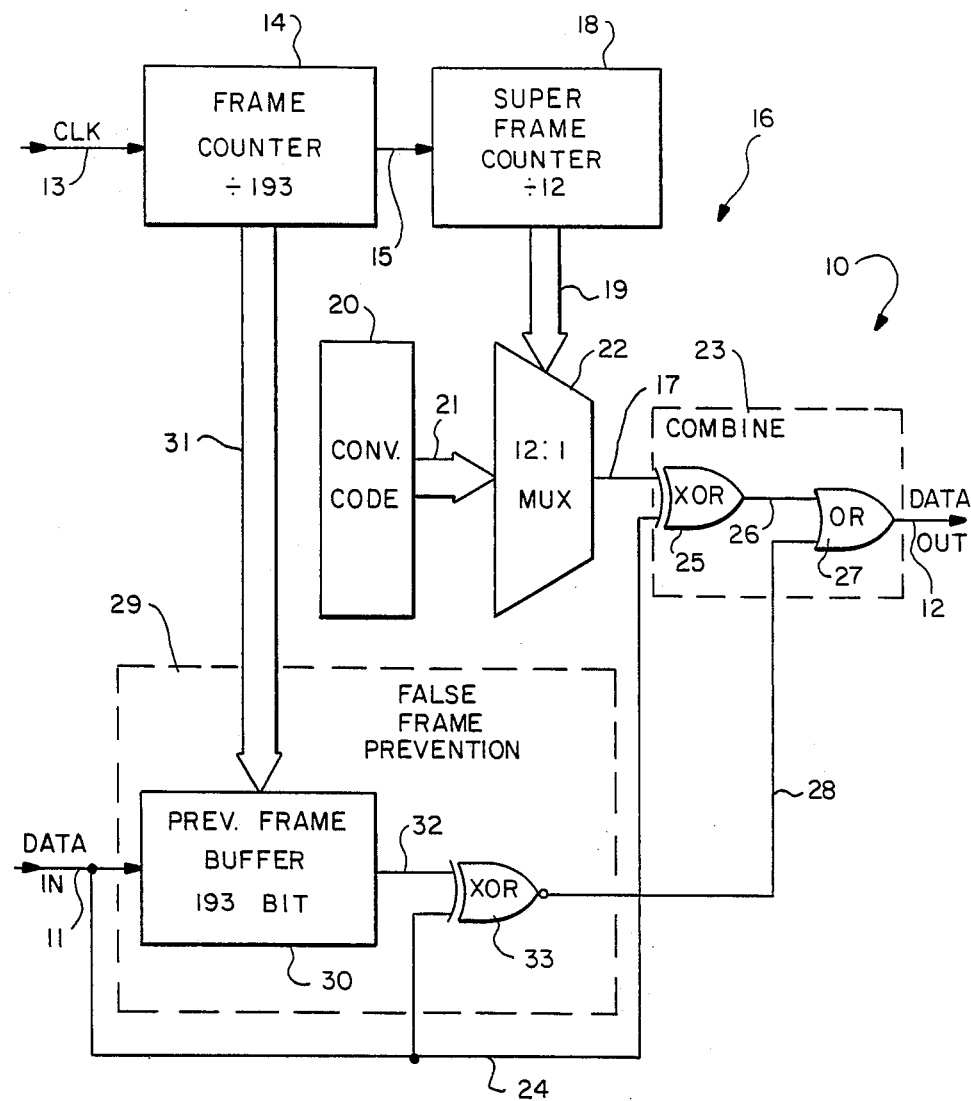
FIG. 1 is a functional block diagram of a preferred embodiment of the present invention.

FIG. 1 illustrates a functional block diagram of an apparatus that receives a time-multiplexed data stream organized in frames, each frame including a plurality of multibit channels and a frame code. A plurality of frames make up a superframe and the frame codes from the plurality of frames in a superframe make up a framing pattern with a preselected format. The apparatus 10 shown in FIG. 1 converts a frame code from the received data stream having a framing pattern in a first preselected format, such as DMA-1, to a frame code in an output data stream having a framing pattern according to a second preselected format such as D2/D4, for detection by a frame code detector, such as the R8060.

The time multiplexed data stream is received on line 11. An output data stream is supplied on line 12. A bit clock is received on line 13 that is synchronized with the input data stream on line 11.

A data path passes through the apparatus 10 from the data in line 11 to the data out line 12 to provide an output data stream on line 12.

A framing means 14 for identifying framing windows in the input data stream in the embodiment shown in FIG. 1 is a frame counter which counts the bits of data in the input data stream in response to a 1.544 MHz clock on line 13. The clock is divided by 193 to generate a 8 kHz framing window signal on line 15. The framing window signal identifies sections of data or intervals, called framing windows herein, during which a frame code bit will occur. In the preferred embodiment, the framing windows are 193 bits long—the same length as a frame—so no prior synchronization with framing codes is required. Equivalent embodiments may identify framing code locations using feedback from a detecting circuit such as the R8060 and provide single bit framing windows for single bit frame codes. Of course, the length of the framing window can vary to suit the needs of a particular implementation.

The framing window signal on line 15 is supplied to a modifying means, designated generally by the numeral 16, for generating a frame code modifier on line 17 in response to the identification of a framing window. The modifying means 16 includes a superframe counter 18 which counts framing windows to generate a modifier count on bus 19. In addition, a code storage means 20 stores a conversion code made up of a plurality of frame code modifiers. The conversion code is supplied across bus 21 to a multiplexer 22. The multiplexer selects a frame code modifier from the conversion code in response to the modifier count on bus 19.

A combining means 23 receives the input data stream across line 24 and the selected frame code modifier across line 17. The combining means 23 combines the frame code modifier with the data stream in the framing window to generate a new data stream on line 24 having frame codes according to the second preselected format. The combining means 23 includes an exclusive OR-gate 25 receiving the modifier on line 17 and the input data stream on line 24 which functionally adds two signals, modulo-2, to supply the new data stream on line 26. In this manner, when a frame code does not need modifying, the signal on line 17 is 0, effectively allowing the input data stream to pass through the output of the exclusive OR-gate 25 on line 26.

The combining means 23 further includes OR-gate 27 which supplies the output data stream on line 12 at its output. The input to OR-gate 27 includes line 26 and the output of a frame error detector on line 28.

The false framing prevention circuit 29 is a means, in communication with the data path, for detecting data that does not match the preselected format of the framing pattern in the received data stream to prevent known non-frame data from being converted erroneously to an illegal frame code. If data that does not match the preselected format is detected, a logical 1 is generated on line 28 for supply to the OR-gate 27 which effectively forces the output data stream to a default value of 1. The default value of 1 reduces the possibility of a false framing pattern error in a frame code detector such as the R8060.

The means 29 for detecting data that does not match the preselected format includes a buffer 30 which stores a previous interval of 193 bits as received across the data in line 11. The buffer 30 supplies a bit on line 32 which corresponds to a current bit in the data stream by preceding it by 193 cycles. Thus, when the current bit is a frame code, the buffer supplies the previous frame code. The previous frame code is combined with the current frame code from line 24 in exclusive OR-gate 33. If the data from the previous framing window on line 32 and the current data on line 24 match, then for the standard DMA-1 frame code, known non-frame data or erroneous frame data has been detected. Therefore, the exclusive OR-gate 33 with an inverted output, as indicated by the small circle, will generate a 1 on line 28 forcing the data in the output data stream to 1. If there is a mismatch, a 0 is supplied on line 28 having no effect on the output data stream. For detected non-frame code data, the false framing prevention circuit will result in the forcing of default values for matching bits, contaminating the data in the output data stream. Therefore, an alternate data path is needed to maintain the integrity of the input data for the embodiment described.

The previous frame buffer 30 operates effectively as a 193-bit shift register supplying a previous frame code for comparison with a current frame code. If the format of the frame codes in the input data stream is more complex, obviously a more complex previous frame buffer would be needed for supplying information based on previous frame codes sufficient to detect illegal patterns. Also, the default value may vary to suit a particular frame code detector.

Figure 2:
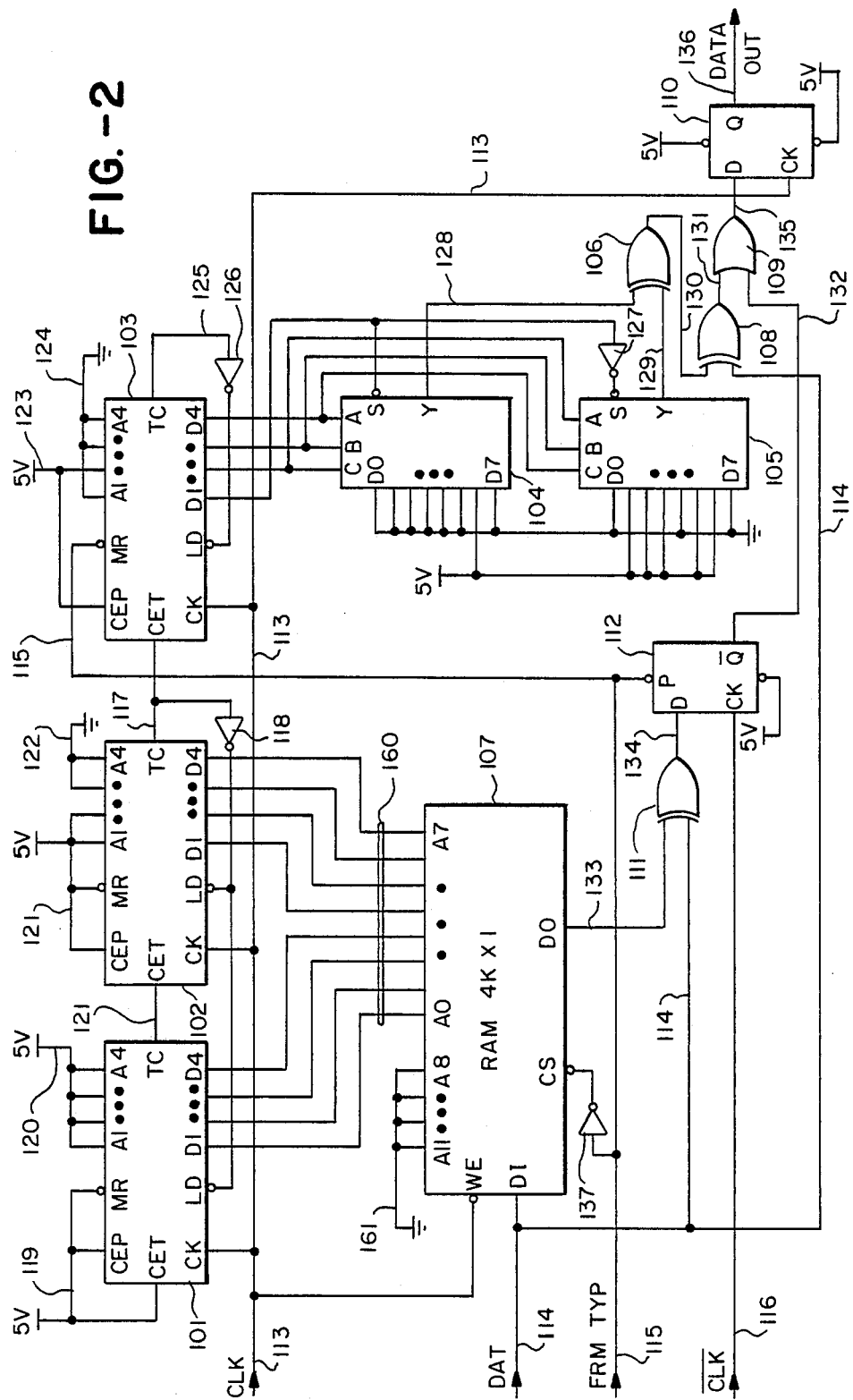
FIG. 2 is a circuit diagram of a preferred embodiment of the present invention.

FIG. 2 illustrates an actual implementation of the preferred embodiment of the present invention. The connections of the chips are shown schematically. The connection should be adapted to meet the specifications of integrated circuits used, which are indicated for major components by parenthetical reference below. A description of the circuit shown in FIG. 2 is provided with cross-references to the corresponding parts of FIG. 1.

The frame counter 14 of FIG. 1 is implemented with a first 4-bit counter 21 (74HC161) and a second 4-bit counter 22 (74HC161). The superframe counter 18 of FIG. 1 is implemented with a third 4-bit counter 23 (74HC161). The multiplexer 22 of FIG. 1 is implemented with a first 8 to 1 multiplexer 104 (74HC151) and a second 8 to 1 multiplexer 105 (74HC151) in combination with an exclusive OR-gate 106. The conversion code storage means 20 of FIG. 1 is implemented by setting the inputs to the multiplexers 104 and 105 to predetermined values. The combining means 23 of FIG. 1 is implemented with exclusive OR-gate 108 and OR-gate 109 in combination with flip-flop 110 to provide synchronization.

The false framing prevention circuit 29 of FIG. 2 is implemented with a 4K by 1 bit RAM 107 (M6147) in combination with exclusive OR-gate 111 and flip-flop 112.

As with the description of FIG. 1, the inputs to the circuits shown in FIG. 2 include an input clock signal on line 113 and an input data signal on line 114. The input clock signal is synchronized with the data stream on line 114. Additional inputs include the inverse of the clock signal on line 116 and a frame type signal on line 115.

The frame type signal on line 115 provides a control signal for a means for disabling the modifier means of the present invention from converting the frame code on the input data stream to a new format. This feature is not illustrated in FIG. 1 and is described in more detail below.

The first counter 101 and second counter 102 are connected to divide the incoming clock signal on line 113 by 193 to generate a carry signal on line 117. The carry signal on line 117 defines a framing window in the input data stream. When a carry signal is generated on line 117, it is supplied back through inverter 118 to the load inputs of the first and second counters 101 and 102.

This function is implemented by setting the enable signals, CET, CEP, and the master reset signal, MR, to a high value across line 119 for the first counter 101. In addition, the counter inputs A1 through A4 are set high on line 120. This results in loading of a starting value of all ones from inputs A1–A4 and the generation of a carry signal on line 121 every 16 bits. The carry signal on line 121 is connected to the enable signal CET of the second counter 102 while the enable signal CEP and master reset signal MR are connected to a high value across line 121. The input signals to the counter 102, A1 through A4, are connected so that A1 and A2 are set high across line 121 and A3 and A4 are set low across line 122. This results in the loading of 1100 for a starting count and the generation of a carry signal on line 117 every 193rd bit.

The output lines D1 through D4 of the first counter 101 are connected across lines 160 to the address inputs A0 through A3 of the 4K by 1 bit RAM 107. Likewise, the output bits D1 through D4 of the second counter 102 are connected across lines 160 to address input bits A3 through A7 of the 4K by 1 bit RAM 107. The remaining address input lines A8 through A11 on the 4K by 1 bit RAM 107 are connected to ground across line 161.

The signal on line 117 is connected to the enable signal CET in the third counter 103. The enable signal CEP is connected to a high value on line 123 and the master reset signal MR is connected to receive the frame type signal on line 115. The counter 103 input A2 is connected to a high value on line 123 and the inputs A1, A3 and A4 are connected to a low value on line 124. In this manner, the counter 103 is connected to generate a carry signal on line 125 every 12 cycles of the input on line 117. The carry signal is supplied through inverter 126 to the load input to the counter 103, causing the counter to recycle every 12 bits. The outputs of the counter 103 D1 through D4 are connected to the first multiplexer 104 and the second multiplexer 105. The outputs D2 through D4 are connected to the C, B and A inputs, respectively, of both multiplexers 104 and 105. The output D1 is connected to the select input of the multiplexer 104 and through inverter 127 to the select input of multiplexer 105. The outputs of the multiplexers 104 and 105 are supplied on lines 128 and 129 respectively as inputs to exclusive OR-gate 106. The output of exclusive OR-gate 106 is a frame code modifier on line 130. The frame code modifier is combined with the input data stream across line 114 in the exclusive OR-gate 108. The output of the exclusive OR-gate 108 is supplied on line 131 as a first input to OR-gate 109. A second input to OR-gate 109 is the output of the illegal frame detector on line 132.

The 4K by 1 bit RAM 107 responds to the address bits A0 through A7 at its input to supply a single bit output on line 133. The single bit output on line 133 corresponds to a frame code from the previous frame. The frame code on line 133 is combined in exclusive OR-gate 111 with the input data stream from line 114. The output of exclusive OR-gate 111 is supplied on line 134 to the D input of flip-flop 112. Flip-flop 112 is clocked by the inverse of the clock across line 116. The inverted output, $\overline{Q}$, of the flip-flop 112 is supplied on line 132 as a second input to the OR-gate 109. The output of OR-gate 109 is supplied on line 135 to the D input of flip-flop 110 which is clocked by the clock signal on line 113. The Q output of the flip-flop 110 is supplied on line 136 as the output data stream.

The frame type signal on line 115 is connected through inverter 137 to the chip select signal, CS, on RAM 107. Further, it is supplied to the preset signal, P, of flip-flop 112 and to the reset signal MR of the counter 103. When the frame type signal is low, the RAM 107 is thus deselected, the counter 103 is reset and the flip-flop 112 is preset. This causes the counter 103 to output all zeros and the flip-flop 112 to output zero. When the frame type signal is 1, the frame code converter circuit shown in FIG. 2 is enabled.

In operation, the circuit in FIG. 2 provides for detection of a DMA-1 frame code using a Rockwell receiver chip R8060 and the DMA-1 to D2/D4 frame conversion circuit shown in FIG. 2.

The counters 101 and 102 divide the clock signal on line 113 down to an 8 kHz signal on line 117. The counter 103 divides the 8 kHz signal on line 117 by 12 giving a "superframe" count out on the outputs D1 through D4. The superframe count on lines D1 through D4 is used to select a frame code modifier bit by selecting and addressing the two 8 to 1 multiplexer chips 104 and 105. The conversion code bits supplied to the multiplexers 104 and 105 are provided below in Table 2. When one of the multiplexer chips 104 or 105 is not selected, it will present a 0 on its Y output, lines 129 or 128 respectively. Thus, one of the two inputs to exclusive OR-gate 106 is always 0. In this manner, the output of exclusive OR-gate 106 is always the selected frame code modifier.

TABLE 2

| phase = 0 | | | phase = 1 | | |
|---|---|---|---|---|---|
| Conversion Code (A) | DMA-1 Code (B) | D2/D4 A XOR B | Conversion Code (A) | DMA-1 Code (B) | D2/D4 A XOR B |
| 0 | 0 | 0 | 0 | 1 | 1 |
| 0 | 1 | 1 | 0 | 0 | 0 |
| 1 | 0 | 1 | 1 | 1 | 0 |
| 0 | 1 | 1 | 0 | 0 | 0 |
| 0 | 0 | 0 | 0 | 1 | 1 |
| 1 | 1 | 0 | 1 | 0 | 1 |
| 1 | 0 | 1 | 1 | 1 | 0 |
| 1 | 1 | 0 | 1 | 0 | 1 |
| 0 | 0 | 0 | 0 | 1 | 1 |
| 1 | 1 | 0 | 1 | 0 | 1 |
| 1 | 0 | 1 | 1 | 1 | 0 |
| 0 | 1 | 1 | 0 | 0 | 0 |

As can be seen in TABLE 2, the DMA-1 framing pattern includes a repeating pattern of frame codes, the pattern being 01. Thus the superframe code has a phase determined by the particular frame code, 1 or 0, received first by the conversion circuit. TABLE 2 illustrates both of these phases, and demonstrates that the conversion code operates independent of the phase.

The input data stream from line 114 is combined in exclusive OR-gate 108 with the selected frame code modifier. The input framing pattern of the input data stream is therefore converted to a D2/D4 framing pattern and the data stream is then gated to a retiming flip-flop 110 through OR-gate 109.

In order to prevent illegal frame code patterns from being converted, a false framing prevention circuit has been included. The circuit compares the currently received bit on the input data stream line 114 with the bit received 193 bits earlier. If the 2 bits are not different as expected with the DMA-1 format, the circuit forces the bit on line 135 to be a 1 regardless of the frame code modifier. This circuit is accomplished by using the output of counters 101 and 102 to address the high speed RAM 107. This RAM outputs the bit that occurred 193 bits previously on line 133 for the half-cycle during which the clock signal on line 113 is high. This output is received in exclusive OR-gate 111 and compared using the exclusive OR-gate function with the input data stream on line 114. If the 2 bits received by the exclusive OR-gate 111 are equal, flip-flop 112 will receive a 0 during this half cycle; otherwise, it will receive a 1. The condition is stored in the flip-flop on the rising edge of the inverse of the clock on line 116. For the second half of the clock cycle, with the input clock on line 113 low, the current bit on the input stream is stored in the RAM for comparison 193 bits later. In this manner, the RAM 107 acts as a 193-bit deep shift register.

The OR-gate 109 will block the converted stream by forcing a 1 to be received at the input to flip-flop 110 when the previous bit and the current bit in this particular bit location do not follow the DMA-1 pattern of alternating between 1 and 0.

CONCLUSION

The preferred embodiment of the present invention provides a means for converting an interleaved DMA-1 framing pattern to a D2/D4 framing pattern so that a commercially available frame code detector can be used to detect the DMA-1 code. At the same time, the invention set any bit location that does not resemble the DMA-1 framing pattern to a default value of 1 so that the likelihood of a false framing pattern is greatly reduced. The advantage provided by the present invention is that it allows the detection of the DMA-1 framing code without the use of component-intensive circuits. Further, the present invention can be adapted for the conversion of other framing patterns as it suits a particular need.

Another advantage provided by the present invention is that by using the frame conversion circuit taught, both DMA-1 frame detection and D2/D4 frame detection can be accomplished in a single circuit without added hardware.

Further, the frame code conversion taught by the present invention is independent of the actual frame detection circuitry (such as the Rockwell R8060 T-1 receiver) actually used. Thus it is possible to apply the frame conversion apparatus taught by the present invention to more powerful frame search products as they become available.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

I claim:

1. In a system receiving a time multiplexed data stream organized in frames and a clock signal synchronized with the data stream, each frame including a plurality of multibit channels and a frame code, a plurality of frames making up a superframe and the frame codes from the plurality of frames in a superframe making up a framing pattern with a preselected format, an apparatus for converting a frame code from the received data stream having a framing pattern in a first preselected format to a frame code in an output data stream having a framing pattern according to a second preselected format, comprising:
   a data path connected to receive the data stream
   framing means, connected to receive the clock signal, for identifying framing windows in the data stream;
   modifying means, in communication with the framing means, for generating a frame code modifier for identified framing windows; and
   combining means, connected to the data path and the modifying means, for combining the frame code modifier with the data stream in the framing window to supply the output data stream.

2. The apparatus of claim 1, further including:
   means, connected to receive a control signal and in communication with the modifying means, for disabling the modifying means in response to the control signal.

3. The apparatus of claim 1, further including:
   means, in communication with the data path, for detecting data that does not match the first preselected format in the received data stream; and
   means, in communication with the combining means and the means for detecting data that does not match the first preselected format, for forcing the combining means to supply a default value in response to the detection of data that does not match the first preselected format.

4. The apparatus of claim 3, further including:
means, in communication with the modifying means and the means for detecting data that does not match the first preselected format and connected to receive a control signal, for disabling the modifying means and the means for detecting data that does not match the first preselected format.

5. The apparatus of claim 3, wherein the means for detecting data that does not match the first preselected format includes:
storage means, connected to receive the received data stream, for storing data from a previous framing window; and
comparing means, in communication with the storage means and the data path, for comparing data received in a current framing window with the corresponding data from the previous framing window.

6. The apparatus of claim 1, wherein the framing means includes:
first counter means for counting bits of data in the received data stream to identify framing windows.

7. The apparatus of claim 6, wherein the modifying means includes:
code storage means for storing a plurality of frame code modifiers;
second counter means for counting framing windows to generate a modifier count; and
selector means, in communication with the code storage means and the second counter means, for selecting a frame code modifier in response to the modifier count.

8. The apparatus of claim 1, wherein the frame codes are single bit codes and the frame code modifiers are single bit codes and the combining means includes:
means for adding, modulo-2, each bit in an identified framing window to the generated frame code modifier.

9. The apparatus of claim 1, wherein the framing pattern having the first format includes a repeating pattern of frame codes so that a given frame code within the repeating pattern defines a phase of the framing pattern, and wherein the modifier means generates a frame code modifier independent of the phase of the framing pattern in the received data stream.

10. In a system receiving a time multiplexed data stream organized in frames and a clock signal synchronized with the data stream, each frame including a plurality of multibit channels and a frame code, a plurality of frames making up a superframe and the frame codes from the plurality of frames in a superframe making up a framing pattern with a preselected format, an apparatus for converting a frame code from the received data stream having a framing pattern in a first preselected format to a frame code in an output data stream having a framing pattern according to a second preselected format, comprising:
a data path connected to receive the data stream
first counter means for counting bits of data in the received data stream to identify framing windows;
code storage means for storing a plurality of frame code modifiers;
second counter means, in communication with the first counter means, for counting framing windows to generate a modifier count;
selector means, in communication with the code storage means and the second counter means, for selecting a frame code modifier in response to the modifier count; and
combining means, connected to the data path and the selector means, for combining the frame code modifier with the received data stream in the identified framing window to supply the output data stream.

11. The apparatus of claim 10, further including:
means, in communication with the second counter means and connected to receive a control signal, for setting the second counter means in response to the control signal to a selected modifier count.

12. The apparatus of claim 10, further including:
means, in communication with the data path, for detecting data that does not match the first preselected format in the received data stream; and
means, in communication with the combining means and the means for detecting data that does not match the first preselected format, for forcing the combining means to supply a default value in response to the detection of data that does not match the first preselected format.

13. The apparatus of claim 12, further including:
means, connected to receive a control signal and in communication with the means for detecting data that does not match the first preselected format and the second counter means, for disabling the means for detecting data that does not match the first preselected format and setting the second counter means to a selected modifier count in response to the control signal.

14. The apparatus of claim 12, wherein the means for detecting data that does not match the first preselected format includes:
storage means, connected to receive the received data stream, for storing data received during a previous framing window; and
comparing means, in communication with the storage means and the data path, for comparing data received during an identified framing window with corresponding data from the previous framing window to detect data that does not match the first preselected format.

15. The apparatus of claim 10, wherein the frame codes are single bit codes and the frame code modifiers are single bit codes and the combining means includes:
means for adding, modulo-2, the received data stream in the identified framing window to the generated frame code modifier to generate the frame code in the output data stream.

16. The apparatus of claim 10, wherein the framing pattern having the first preselected format includes a repeating pattern of frame codes so that a given frame code within the repeating pattern defines a phase of the framing pattern and the plurality of frame code modifiers make up a conversion code, and wherein the selector means selects a frame code modifier from the conversion code independent of the phase of the framing pattern in the received data stream.

* * * * *